Aug. 31, 1937.     H. HUNERKOPF     2,091,855
VARIABLE CAPACITOR
Filed May 14, 1935
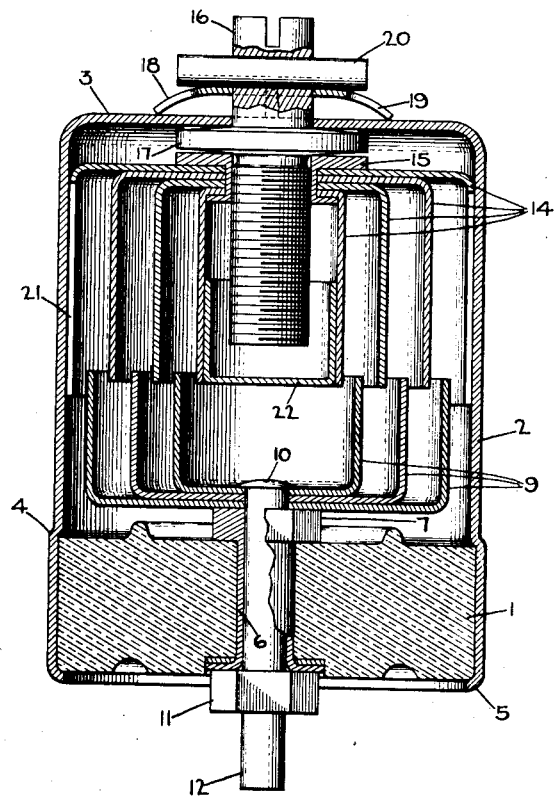
Inventor:
Henry Hunerkopf,
by Harry E. Dunham
His Attorney.

Patented Aug. 31, 1937

2,091,855

UNITED STATES PATENT OFFICE 2,091,855

VARIABLE CAPACITOR

Henry Hunerkopf, Bridgeport, Conn., assignor to General Electric Company, a corporation of New York Application May 14, 1935, Serial No. 21,320

1 Claim. (Cl. 175—41.5)

My invention relates to variable capacitors, and particularly to a construction of variable capacitor which is especially suitable for use as a trimmer in radio apparatus. It is the object of my invention to provide a variable capacitor which is simple and sturdy in construction, efficient and reliable in operation and inexpensive to manufacture.

My invention will be better understood from the following description taken in connection with the accompanying drawing, and its scope will be pointed out in the appended claim.

Referring to the drawing of which the single figure is a cross-sectional view of a preferred embodiment of my invention, 1 represents the base member which is cylindrical in form and may be of any suitable insulating material but preferably of a ceramic material. The enclosing metallic cylindrical casing 2 having the wall 3 at one end thereof, whereby it has a cup-like shape, is firmly secured at its other end to the insulating base 1. The casing is shown having a slight offset at 4 making a shoulder against which the inner edge of the base 1 engages and has its edge 5 swaged over the outer edge of the base. The base is constructed with a central opening therethrough and before the base is secured in the casing the rivet 6 is passed through that opening and firmly secured to the base. The upper face of the head 7 of the rivet is faced off so as to be perpendicular to the axis of the cylindrical base 1 in order to form a suitable surface upon which the fixed cups are to be secured. Rivet 6 is bored out or if a hollow rivet is employed it is rebored so that the opening therethrough is exactly concentric with the cylindrical face of the base 1.

The fixed plates of the capacitor comprise the nested cups 9 whose outer portions are cylindrical and whose end portions are firmly secured against the upper face of rivet 7 by means of the rivet 10. This rivet passes through rivet 6 and is shown having the outer hexagonal head 11. It is also provided with the extension 12 to constitute a terminal for the fixed plates of the capacitor.

The movable plates of the capacitor comprise the nested cups 14 which in form are similar to the cups 9 but which are constructed to interleave with the latter cups. Cups 14 are secured together as a unit by the central rivet 15 through which is threaded the adjusting screw 16. This screw has the integral flange 17 which engages the inner face of the end wall 3 of the casing and is held resiliently thereagainst by the spring washer 18. This washer preferably has notches 19 therein to increase its resiliency and is held under tension by the cross-pin 20 passed through a hole in the screw 16. The outermost cup 14 is constructed to snugly fit the casing 3. To increase the friction between this cup and the casing the cup preferably is provided with a plurality of longitudinal slots 21 whereby the portions between the slots may more readily yieldably engage the casing. Within the innermost cup 14 I have shown the small cup 22 which serves to retain any small particles which may wear off the screw. Preferably the threaded portion of the screw 16 is slightly tapered at each end thereof in order to prevent jamming of the movable and fixed parts of the capacitor.

With the construction above described it will be seen that as the screw 16 is turned in one direction or the other to effect adjustment of the capacitor the group of nested cups 14 will be moved longitudinally with reference to the fixed cups, since the frictional engagement between the casing and the outermost cup is sufficient to prevent any rotative movement of the nested cups 14.

I have chosen the particular embodiment described above as illustrative of my invention and it will be apparent that various modifications may be made without departing from the spirit and scope of my invention which modifications I aim to cover by the appended claim.

What I claim as new and desire to secure by Letters Patent of the United States, is:—

A variable capacitor comprising an insulating base, a cup-like casing having its open end surrounding and secured to said base, a group of fixed nested cups in the casing, a combined terminal and securing stud for said groups of cups arranged centrally of and extending through said base, a group of movable nested cups in said casing the outermost cup of which is constructed frictionally to engage the side wall of said casing, an adjusting screw having resilient means for frictionally retaining it in the end wall of the casing and threaded into said group of movable cups and means for enclosing the screw to prevent detached particles from lodging between the fixed and movable cups.

HENRY HUNERKOPF.